(12) United States Patent
Demtroder

(10) Patent No.: US 9,371,822 B2
(45) Date of Patent: Jun. 21, 2016

(54) WIND TURBINE WITH BEARING SUPPORT

(75) Inventor: Jens Demtroder, Rønde (DK)

(73) Assignee: Vestas Wind Systems A/S, Aarhus N. (DK)

(*) Notice: Subject to any disclaimer, the term of this patent is extended or adjusted under 35 U.S.C. 154(b) by 404 days.

(21) Appl. No.: 13/877,109

(22) PCT Filed: Sep. 27, 2011

(86) PCT No.: PCT/DK2011/050362
§ 371 (c)(1),
(2), (4) Date: Mar. 29, 2013

(87) PCT Pub. No.: WO2012/041322
PCT Pub. Date: Apr. 5, 2012

(65) Prior Publication Data
US 2013/0195632 A1   Aug. 1, 2013

Related U.S. Application Data

(60) Provisional application No. 61/388,202, filed on Sep. 30, 2010.

(30) Foreign Application Priority Data

Sep. 30, 2010   (DK) .................................. 2010 70418

(51) Int. Cl.
| | |
|---|---|
| *B63H 3/00* | (2006.01) |
| *B63H 5/00* | (2006.01) |
| *F01D 11/00* | (2006.01) |
| *F01D 25/16* | (2006.01) |
| *F03D 11/00* | (2006.01) |

(Continued)

(52) U.S. Cl.
CPC ............ *F03D 11/0008* (2013.01); *F16C 23/06* (2013.01); *F16C 35/04* (2013.01);
(Continued)

(58) Field of Classification Search
CPC ............ F03D 11/0008; F05B 2240/54; F05B 2260/30; F05B 2260/301; Y02E 10/722; F16C 2360/31; F16C 35/04
USPC .................. 416/174; 415/170.1; 348/537, 584
See application file for complete search history.

(56) References Cited

U.S. PATENT DOCUMENTS

| | | |
|---|---|---|
| 2,687,926 A | 8/1954 | Gair et al. |
| 3,639,015 A | 2/1972 | Maas |

(Continued)

FOREIGN PATENT DOCUMENTS

| | | |
|---|---|---|
| WO | 2005110032 A2 | 11/2005 |
| WO | 2006072012 A2 | 7/2006 |

OTHER PUBLICATIONS

International Searching Authority, International Search Report issued in corresponding PCT/DK2011/050362 mailed Mar. 23, 2012, 3 pages.

*Primary Examiner* — Theresa Trieu
(74) *Attorney, Agent, or Firm* — Wood, Herron & Evans, LLP

(57) ABSTRACT

A wind turbine generator with a bearing system is disclosed. The bearing system includes a lockable connection having a bearing surface and a support surface which surfaces are engaged when the lockable connection is locked. Forces from the shaft are transferred via the bearing into the support through the bearing surface, wherein a support angle of the support surface, relative to a shaft plane formed by rotating the shaft around a first axis, which first axis is perpendicular to the center axis and which first axis is comprised in a vertical plane, is in a range from and including 5 degrees to and including 70 degrees.

14 Claims, 6 Drawing Sheets

(51) Int. Cl.
  *F04D 29/04* (2006.01)
  *F16C 35/04* (2006.01)
  *F16C 23/06* (2006.01)
  *F16C 35/067* (2006.01)

(52) U.S. Cl.
  CPC .......... *F16C 35/067* (2013.01); *F05B 2240/54* (2013.01); *F05B 2260/30* (2013.01); *F05B 2260/301* (2013.01); *F16C 2360/31* (2013.01); *Y02E 10/722* (2013.01)

(56) References Cited

U.S. PATENT DOCUMENTS

| | | | | |
|---|---|---|---|---|
| 5,140,856 | A * | 8/1992 | Larsen | 416/144 |
| 5,971,622 | A * | 10/1999 | Akazawa | 384/558 |
| 7,534,048 | B2 * | 5/2009 | Holman | 384/537 |
| 7,572,061 | B2 * | 8/2009 | Fox et al. | 384/494 |
| 8,264,097 | B2 * | 9/2012 | Numajiri | 290/55 |
| 2011/0206310 | A1 * | 8/2011 | Ventzke | 384/565 |

* cited by examiner

WIND TURBINE WITH BEARING SUPPORT

FIELD OF THE INVENTION

The invention relates to a wind turbine generator with an improved bearing system, and in particular to an improved bearing system of a kind for precisely controlling and supporting a main shaft of the wind turbine.

BACKGROUND OF THE INVENTION

A Wind turbine generator (WTG) is used to gather wind energy and to transform the energy into another form of energy. For this purpose most wind turbine generators include a shaft which in one end is coupled to a rotor comprising a number of wind turbine blades. In the opposite end, the shaft is normally connected to a driven wind turbine part. This driven wind turbine part may be an entrance member of a gearbox or an entrance member or torque transferring member of an electric energy generator. Upon rotation of the shaft, in response to wind acting on the blades, energy can be transformed.

In order to control precisely the rotation of the shaft while also supporting the shaft, the shaft is supported by a number of bearings positioned along the shaft. These bearings are provided in order to transfer loads from the shaft and into a supporting structure of the bearings and the bearings are provided for enabling rotation torque of the shaft to be transferred into the gearbox and/or the generator.

The main loads are typically in an axial direction of the shaft as well as, and e.g. due to a weight of the rotor, in direction of gravity or substantially in the direction of gravity. In a so-called horizontal axis wind turbine, as embodied herein, such loads are typically transferred further on into a frame like structure in a nacelle of the wind turbine and from there on via a yawing system into a tower of the wind turbine and into a foundation in the ground.

As the size of wind turbines tend to increase, the loads acting on one or more of the bearings and their respective support structure also tend to increase.

The forces acting on the shaft are, in addition to the main load directions mentioned, also present in directions which are radial to the shaft but not substantially in the direction of gravity. Such forces are among others due to the dynamical variation of the wind, both in direction and amplitude, and due to a yawing movement of the nacelle.

Various bearing solutions and systems have been seen in order to control precisely the rotation of the shaft while providing a steady and precise support of the shaft of the wind turbine. In view of the present inventor and applicant these solutions may be seen to have one or more of the following examples of disadvantages.

Some solutions tend to provide a bearing system of one or more bearings and their supports which have proven to be so heavy and/or to be provided with relatively large dimensions that installation or servicing of these bearing systems have proven to be difficult and/or quite time consuming. Still further such solutions, where a single bearing with supporting structure may weigh around 600-1200 kilos, have proven quite costly to produce.

Some solutions tend to necessitate a very precise positioning of bearing parts relative to the supporting structure and/or tend to require costly and/or very precise manufacturing tolerances for both the bearing and the support, in order to precisely control and support the shaft and the loads acting on the shaft.

Still further and in some solutions, upon servicing a bearing, it has proven difficult and/or time consuming to exchange the bearing, i.e. to detach the bearing from its supporting structure. In some cases this is at least partly due to corrosion.

Some solutions have proven that they were not able to withstand the loads acting on the shaft, or have at least proven that these solutions were not able to withstand the loads in a precisely controlled manner in an amount of years as initially assessed and yet some solutions have additionally or alternatively proven to be too expensive when considering their overall effectiveness.

SUMMARY OF THE INVENTION

It may be seen as an aim of the present invention to provide a wind turbine generator with an improved bearing system. Preferably, the invention alleviates, mitigates or eliminates one or more of the above or other disadvantages singly or in any combination.

In particular, it may be seen as an object of the invention to provide a wind turbine generator with a bearing system, which bearing system enables a precise and controlled support of one or more bearings in the system while the bearing system is also relatively efficient to produce and install.

Accordingly there is provided a wind turbine comprising a bearing system, the bearing system comprising a bearing for bearing a shaft having a centre axis, the bearing comprising at least one bearing surface a support for supporting the bearing, the support comprising at least one support surface a lockable connection between said bearing and said support, such as a connection comprising bolts, where the lockable connection comprises the at least one bearing surface and comprises the at least one support surface, wherein the support surface is directly and rigidly engaged with and supports the bearing surface when the lockable connection is locked and where forces from the shaft are transferred via the bearing and into the support through said bearing surface being engaged with said support surface, and where said lockable connection ensures a fixed distance between the bearing and the support by the surfaces being directly and rigidly engaged, and wherein a support angle of said support surface, relatively to a shaft plane formed by rotating the shaft around a first axis, which first axis is perpendicular to the centre axis and which first axis is comprised in a vertical plane, is ranging from and including 5 degrees to and including 70 degrees.

Thus, a wind turbine with an improved bearing system is provided. The improvement or advantage of the wind turbine with the described bearing system may possibly lie therein that the wind turbine with such bearing system enables a precise and controlled support of one or more bearings in the system while the bearing system is also relatively efficient to produce and install.

In particular it may be seen as a possible advantage of the bearing system, that both a bearing and a support of the bearing in accordance with the present invention may be provided using less material and/or using material which has a lower density and/or which is relatively cheaper and/or which is not needed to have the same strength in comparison with some other solutions.

It may be seen that the improvements or advantages of the bearing system as described herein, and in particular of an angled support surface as described, enable that both the bearing and the support of the bearing can be provided using less material and/or using material which has a lower density and/or which is relatively cheaper and/or which is not needed to have the same strength in comparison with some other solutions.

When providing the support surface in accordance with the present invention, a given amount of radial forces or radial force components in the shaft plane can be transferred from the shaft via the bearing and into the support as normal forces.

This is contrary to a solution where an angle of the support surface relatively to the shaft plane is 0 degrees and where a connection between a bearing surface and a support surface thus only comprises transfer of radial force components in the shaft plane due to friction between such bearing surface and such support surface. In such a solution relatively larger bearing surfaces and corresponding support surfaces are needed in order to transfer a given size of radial forces in the shaft plane and/or a relative higher amount of pressure for pressing the surfaces towards each other is needed in order to transfer a given size of force components in the shaft plane, when compared to the present bearing system.

Still further it has been found that a set of e.g. two support surfaces and two corresponding bearing surfaces in accordance with the present invention can be provided relatively independently of an exact distance between the two support surfaces and the two corresponding bearing surfaces. When such surfaces are substantially flush and provided with substantially the same or the same angles, a more or less minor difference in a distance between two supporting surfaces relatively to a width between two corresponding bearing surfaces, can be determined so that the bearing would only be lifted or lowered somewhat in its support relatively to the shaft plane, although being supportable by and able to engage properly with the support structure.

This is contrary to a bearing system where a set of two corresponding bearing surfaces and two support surfaces are all provided with an angle relative to the shaft plane which is 90 degrees. In such a solution a deviation in the width between two corresponding bearing surfaces would result in a connection which does not fit and cannot be properly engaged so as e.g. to control precisely the position of the bearing and thus the shaft for the bearing in both radial directions parallel to the shaft plane. In order to assure proper engagement such solutions may be seen to necessitate a relatively low tolerance of e.g. the distance between two support surfaces and corresponding bearing surfaces, and thus such solutions are more expensive to produce and assemble, relatively to the present solution.

Still further it has been found that the improved wind turbine generator with the bearing system as described, especially in particular embodiments thereof, may be seen to have the further advantage that the bearing is self centering when compared to other solutions.

Furthermore, a possible advantage of the present bearing system may be seen to be that the present bearing system provides a precise position of the bearing and the support relatively to each other in an effective and alternative manner. This advantage may be seen to be provided by the support surface being directly and rigidly engaged with the bearing surface when the lockable connection is locked and thus ensuring a fixed distance between the bearing and the support while the support angle as described adds to the precision and effectiveness of the bearing system in a way which in practice has been found to be synergetic.

In the present embodiment the system and locking means, i.e. the bolts, assures that the connection remains rigid and thus that there is e.g. a fixed distance between the bearing 202 and the support 206.

Support angles above 0 degrees but below about 5 degrees have e.g. been found to enable too little an amount of force to be transferred as a normal force between the surfaces. Thus, such solutions have been found to provide too little advantage compared to an additional hassle of precisely providing the correct and precise corresponding angles of the bearing surface and the support surface. For the angles between 70 and 90 degrees it has been found that these angles enable an unnecessarily high amount of radial forces to be transferred as normal forces in a direction of the shaft plane. Still further such angles may be seen to transfer too high a degree of forces acting in a direction of gravity or oppositely of gravity into forces acting in a radial direction parallel to the shaft plane. Still further, different widths of the distances between corresponding sets of bearing and support surfaces will at such angles lift or lower a bearing support position too much which may be found inappropriate.

Thus, when the support angle is ranging from and including 5 to and including 60 degrees, the advantages as described above still apply, although e.g. a disadvantage of providing less lift or lowering the bearing position with a certain tolerance of a distance between corresponding bearing and support surfaces is somewhat decreased.

When the support angle is ranging from and including 10 to and including 45 degrees, an increased advantage of this interval may be seen as that a somewhat increased share of forces with a component in the shaft plane can be transferred as normal forces and e.g. that a still lower share of forces acting in a direction of gravity or oppositely of gravity is transferred to the radial direction of the shaft plane.

It may be seen that an optimum of the support angle is found, along these and other ways as described herein, to be when the support angle is predetermined and fixed at an angle in a range from and including 15 to and including 30 degrees.

When a plurality of support surfaces are provided and where each of the plurality of support surfaces is arranged in order for each surface to form a part of a side of a virtual prism with a number of sides, a way of positioning one or more sets of supporting surfaces and their corresponding bearing surfaces is provided. Hereby the supporting surfaces are also provided in symmetry relatively to each other which may be seen to simplify production of such a bearing and corresponding support.

The optional features of the bearing being provided in a plurality of sections, such as a first section and a second section, where at least one of the plurality of sections, such as the second section, comprises a bearing surface connected to the support surface, are advantageous since by such features the bearing may be easily exchanged in a radial direction while the advantages of the present invention are still encompassed in the bearing. In accordance with a further embodiment the bearing is provided with an intermediate bearing housing where the bearing housing comprises a bearing housing surface connected to a support surface and possibly this bearing housing is also provided with a plurality of sections where at least one of the plurality of sections comprises a bearing housing surface connected to a support surface.

At least two support surfaces may be provided, preferably in one single bearing, and the support angle of at least one of the at least two support surfaces is to be measured in a plane comprising a radial direction of the shaft. Similarly at least two support surfaces may be provided, preferably in one single bearing, and at least one of the at least two support surfaces is to be measured in a plane comprising an axial direction of the shaft.

When a bearing of the bearing system includes a set of two oppositely positioned bearing surfaces with a distance between them and two corresponding support surfaces and two corresponding bearing and support surfaces are provided with the same or substantially the same angle relatively to the shaft plane, a possible advantage is that radial forces in the shaft plane can be transferred in accordance with the present invention in both opposite directions. Especially and hereby a possible advantage of providing a bearing which is self adjusting towards a position where the surfaces are parallel with each other is provided.

When the support for supporting the bearing, such as a bearing most adjacent to the rotor, includes two symmetrically angled support surfaces, and possibly also symmetrically positioned relatively to a middle of the wind turbine generator, a possible advantage is that the bearing is self centering towards a predetermined middle of the WTG.

In accordance with embodiments of the invention two support surfaces are provided on a support and adapted so as to be engaged with two corresponding bearing surfaces on a lowermost half part of a single bearing, relative to the direction of gravity, of that bearing.

When a bearing, such as a bearing less adjacent to the rotor or such as a front most bearing towards the rotor, includes at least one support surface with a support angle which is measured in a plane comprising an axial direction of the shaft, a bearing which may be particularly suited for transferring axial forces is provided.

It must be understood that any advantage mentioned may be seen as a possible advantage provided by the invention, but it may also be understood that the invention is particularly, but not exclusively, advantageous for obtaining the described advantage.

In general the various aspects and advantages of the invention may be combined and coupled in any way possible within the scope of the invention.

These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
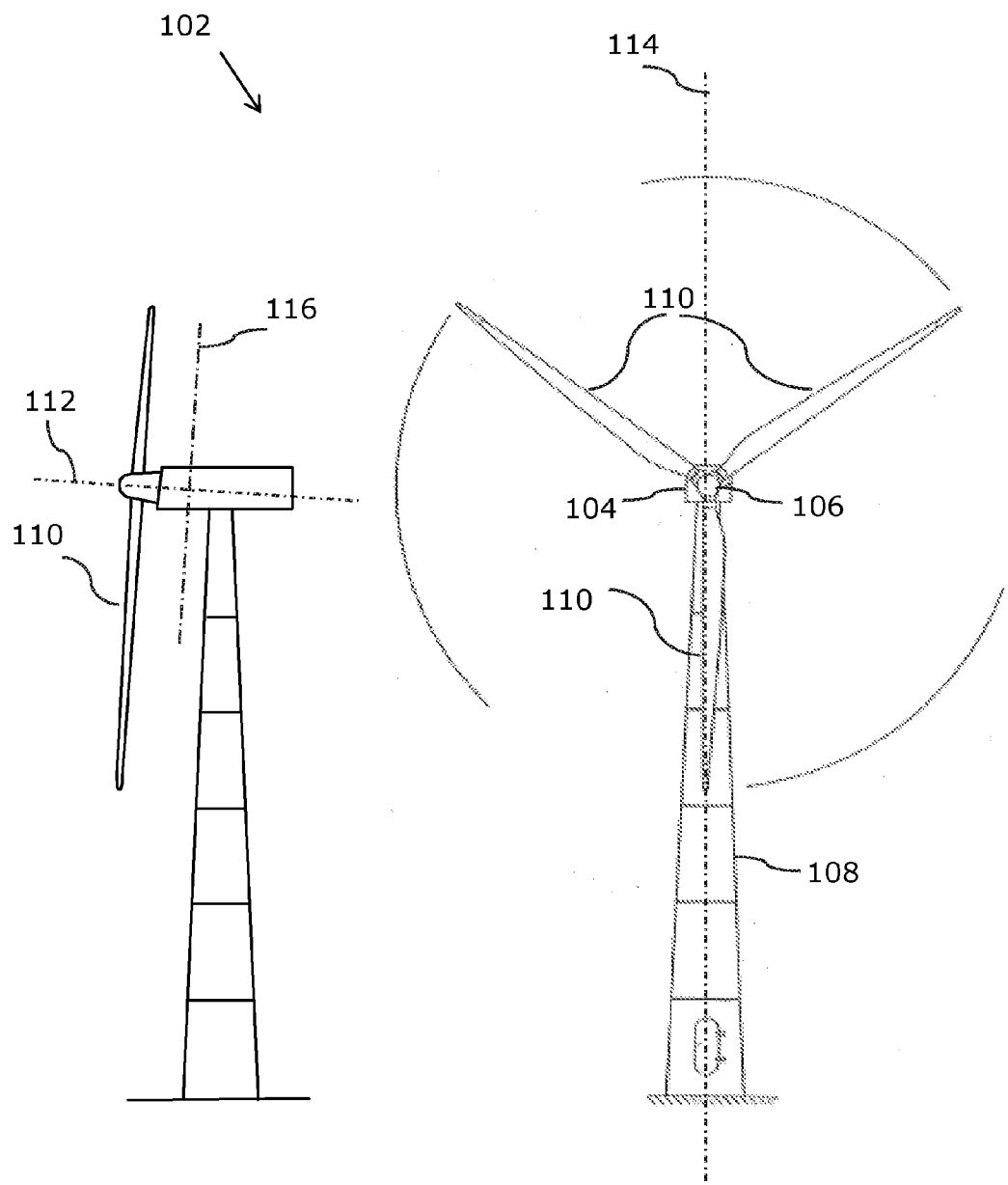
FIG. 1 shows a reference WTG.

FIG. 1 shows a wind turbine generator 102 with a nacelle 104, and a rotor 106 pivotally mounted to the nacelle 104 via a shaft. The nacelle 104 is mounted on a wind turbine tower 108 via a rotary joint enabling a yawing rotation of the nacelle relatively to the tower.

The rotor 106 of the wind turbine of the present example includes three wind turbine blades 110 attached to the rotor in a root end of the blades. The rotor is fixed to a main shaft (not seen in FIG. 1, e.g. refer to FIG. 2) of the wind turbine and rotates in a precise and controlled manner with the main shaft. The main shaft has a centre axis 112. The centre axis is positioned substantially in middle or in the middle of e.g. the tower of the WTG. The length of the blades of the wind turbine in the shown example is approximately 40 meter, but blade lengths such as between 25 and 70 meters are also usual. On the figure the straight dash-dotted line illustrates a vertical plane 114.

To the left of the drawing the wind turbine is shown in a side view. In the side view the straight dash-dotted line illustrates a first axis 116 which is perpendicular to the centre axis 112 of the main shaft.

Figure 2:
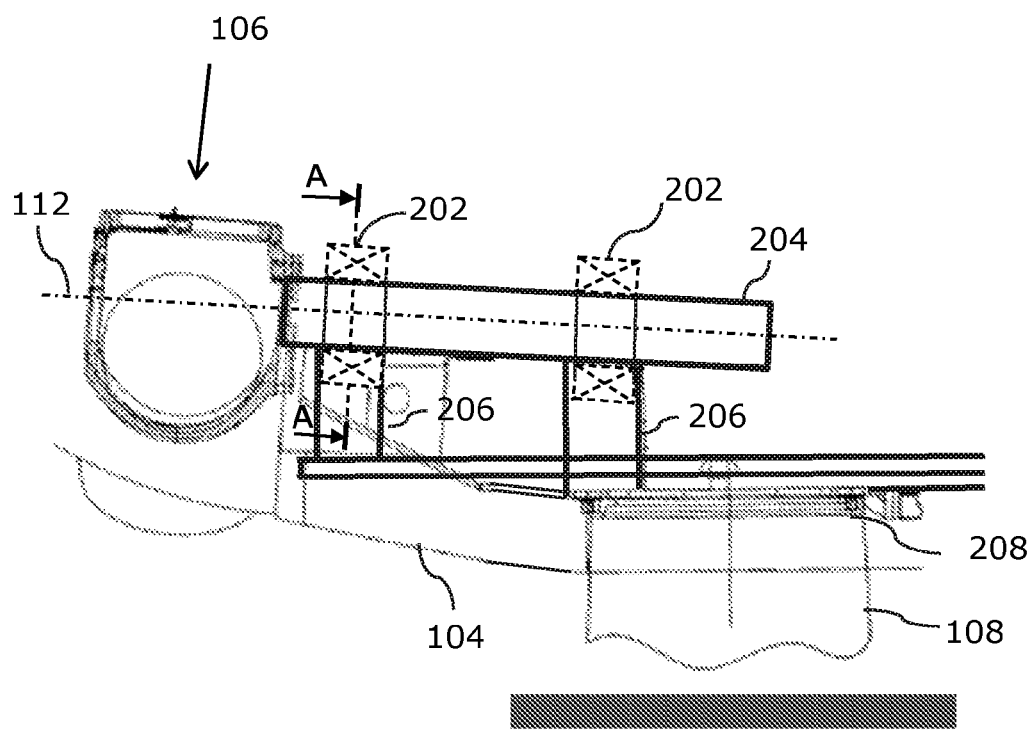
FIG. 2 is an illustration of a cross sectional view A-A inside a nacelle of a WTG.

FIG. 2 is an illustration of a cross sectional view along the centre axis 112 of the main shaft 204 inside the nacelle 104 of an embodiment of a WTG in accordance with the present invention.

It follows from the figure that the rotor 106 to the left of the figure is connected to the main shaft 204 and that the shaft is supported by two bearings 202 positioned along the shaft and illustrated in two different distances from the rotor and to the right of the figure. The shaft may or may not be hollow and a typical diameter of such shaft is 1-3 meters. The two bearings can be referred to as a front most bearing towards and most adjacent to the rotor 106 and shown to the left of the figure and a bearing 202 to the right of the figure and thus less adjacent to the rotor 106. The front most bearing may be referred to as a main bearing of the wind turbine and the bearing system according to the invention may possibly be preferred to be used for such main bearing. The figures illustrate supports 206, one for each bearing 202, leading to a main frame of the WTG which main frame is connected to the tower 108 via a rotary joint.

A cross sectional view perpendicular to the centre axis 112, perpendicular to and through the front most bearing 204 is determined on the figure and indicated with A-A. The cross sectional view is seen in a direction away from the rotor. This cross sectional view can be seen in FIG. 3.

Figure 3:
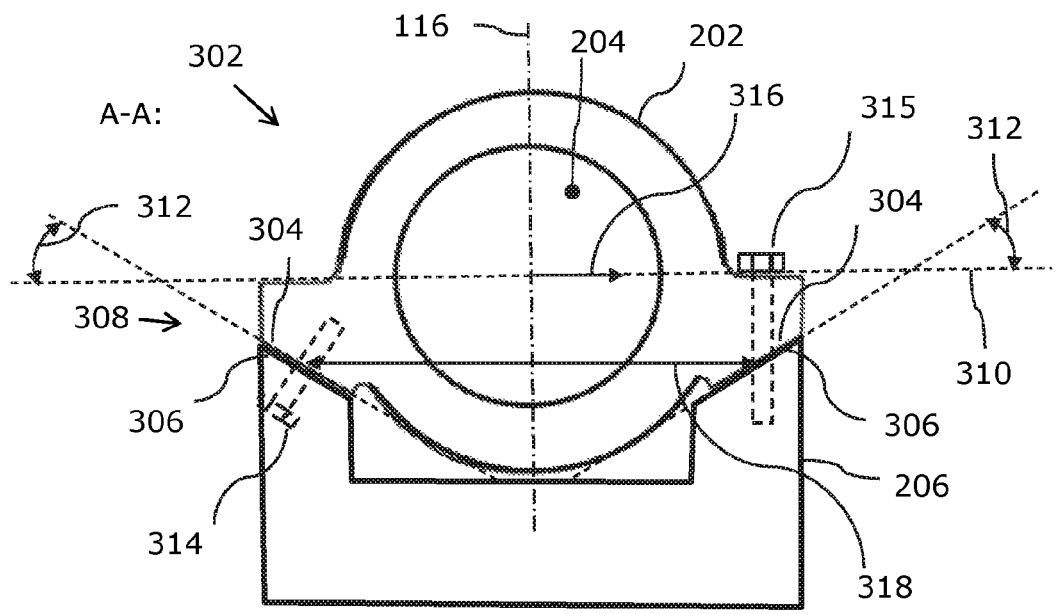
FIG. 3 shows a bearing system including support in the cross sectional view A-A illustrating a cross sectional view of a support angle relatively to a shaft plane.

FIG. 3 shows the cross sectional view A-A indicated in FIG. 2. In particular the figure discloses a bearing system 302 including a bearing 202 for bearing a shaft 204 having a centre axis 112 (not shown in FIG. 3, see e.g. FIG. 2), the bearing including at least one bearing surface 304 and a support 206 for supporting the bearing 202, where the support includes at least one support surface 306. In the shown embodiment two bearing surfaces and two corresponding support surfaces are shown.

The surfaces are adapted to form part of a lockable connection between the bearing 202 and the support 206. In the shown example the lockable connection includes two different examples of bolts 314, 315. In the figure nuts or threads or oblong supporting holes for slightly adjusting a position of the bolts etc. are not illustrated. The lockable connection includes the at least one bearing surface 304 and the at least one support surface 306, which support surface is adapted to be directly and rigidly engaged with and supports the bearing surface when the lockable connection is locked and where forces from the shaft 204 are transferred via the bearing 202 and into the support 206 through the bearing surface 304 being engaged with the support surface 306. In the shown example the lockable connection is rigidly locked by the surfaces being held directly to and towards each other and possibly biased towards each other with a given predetermined pressure by the bolts. It follows that the bolts and holes for the bolts or similar locking means are provided through the support and bearing surfaces. In the present embodiment the system and locking means, i.e. the bolts, assures that the connection remains rigid and thus that there is e.g. a fixed distance between the bearing 202 and the support 206.

The figure furthermore discloses and illustrates that a support angle 312 of at least one of the support surfaces 306, relatively to a shaft plane 310 formed by rotating the shaft around the illustrated first axis 116, which first axis is perpendicular to the centre axis 112 and which first axis is comprised in a vertical plane (114, shown in FIG. 1), is provided with an angle which is 30 degrees or substantially 30 degrees.

As detailed further herein, the angle may among others be selected and predetermined in response to one or more of various factors such as; a length of the wind turbine blades, the weight of the rotor comprising a number of blades, the number of blades and/or the particular wind conditions expected and thus generally and as an example, selected in response to a distribution of particular forces from the wind turbine generator shaft.

Although the illustrated angle is about 30 degrees, the preferred and advantageous ranges for this angle which are found suited for horizontal axis wind turbines with two or three blades each having a length between 25 and 70 meters and which angle is suited for wind loads as normally experienced at various installation sites by nowadays wind turbine generators, has been found to be from and including 5 degrees to and including 70 degrees.

FIG. 3 furthermore illustrates that the two bearing surfaces 304 and the two support surfaces 306 are adapted so that they are flush and parallel with each other. It is also illustrated that the two support surfaces 306 provided have a support angle 312 which is measured in a plane comprising a radial direction 316 of the shaft. Still further it is illustrated that the support surfaces 306 and their corresponding bearing surfaces 304 are symmetrically angled relatively to the first axis 116. In the shown embodiment the support surfaces are also symmetrically positioned relatively to the first axis 116 one on each side of the first axis. Particularly it is disclosed that two support surfaces 306 are provided and adapted so as to be engaged with two corresponding bearing surfaces 304 on a lowermost half part 308, relative to the direction of gravity when positioned as illustrated in the WTG, of the bearing 202.

Finally, FIG. 3 also illustrates a bearing with a set of two oppositely positioned bearing surfaces 304 with a distance 318 between them and two corresponding support surfaces 306 also with the same distance 318 between them. In the example the two corresponding bearing and support surfaces are also provided with the same angle 312 relatively to the shaft plane.

The bearing may as examples be selected from the following types of bearings: a type of ball bearing, a cylindrical roller bearing, a spherical roller bearing, a slide bearing.

The material of the bearing, such as the material of that part of the bearing which includes the bearing surface, such as an outer ring of the bearing or the bearing housing can as examples be provided in steel or a synthetic material or a composite material.

The material of the support may as examples be chosen to be steel, a synthetic material, such as a material which includes a synthetic plastic material, concrete or a concrete like material, a composite material, such a composite material including a reinforcement material such as carbon fibres.

Figure 4:
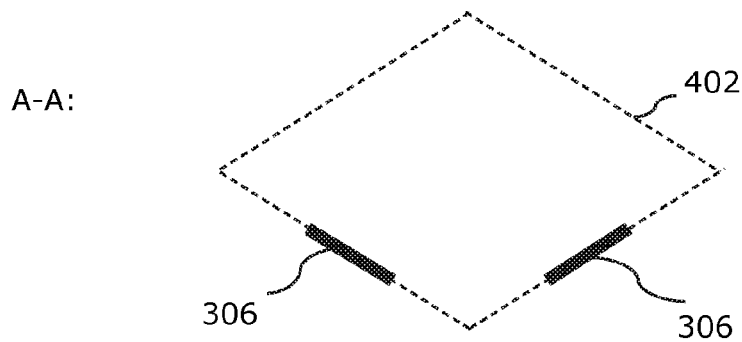
FIGS. 4 and 5 are illustrations of virtual support prisms.
Figure 5:
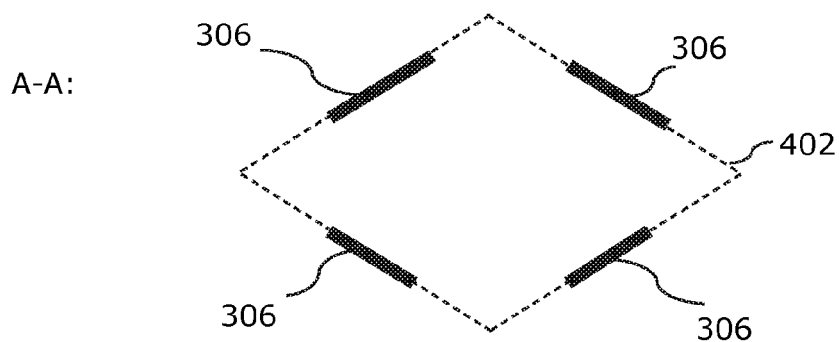

FIGS. 4 and 5 illustrate cross sections A-A of support surfaces where a plurality of support surfaces 306 is provided and where each of the plurality of support surfaces is arranged in order for each surface 306 to form a part of a side of a virtual prism 402 with a number of sides, which prism in the present example can be drawn to surround a circumference of the bearing. In the example illustrated in FIGS. 9 and 10 the support surface may also be disclosed as comprised on sides of such virtual prism, but in that example the prism does not surround the bearing.

The number of sides, N, illustrated in the cross section of the prisms is 4, but the number of sides may be 3, 5, 6, 7, 8, 12 or even 16 or 24. The support surfaces may be spread as shown in FIG. 4 or as shown in FIG. 5. It is to be understood that the support surfaces have corresponding prismatic bearing surfaces.

Figure 6:
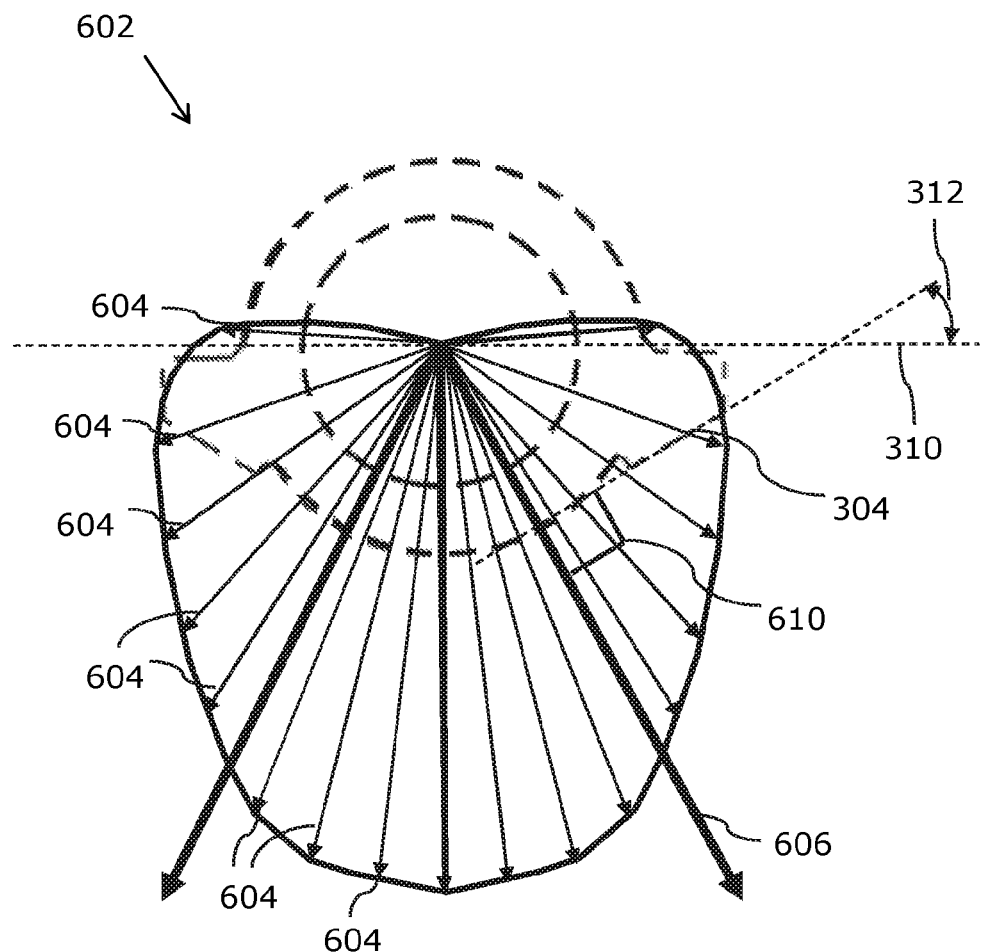
FIG. 6 is an illustration in view A-A of forces from a main shaft of the WTG.

FIG. 6 is an illustration of a distribution of forces from a main shaft (not illustrated) supported by the bearing, in the cross section A-A as indicated in FIG. 1. The forces are in the illustration acting on a front most bearing adjacent to the rotor of the wind turbine. The front most bearing is for illustration purposes shown with dashed lines and overlaid the distribution. In the example the bearing is provided with two bearing surfaces 304, one surface symmetrically positioned on opposite sides of the bearing relative to a centre axis of the bearing.

The forces have different amplitudes and directions. This is illustrated with a different length and direction of the arrows 604, which arrows symbolises the forces. In the shown example the forces are generally symmetrically distributed relatively to a vertical plane along a centre of the bearing. Only the forces to the left of the illustration are provided with reference numbers.

The forces also vary over time, mainly due to variations in the load from the wind. The illustrated distribution is an illustrative sample of the directions and amplitudes over a given sample period such as one hour, 24 hours, one week, one or more months or one or more years. The forces are present in all or substantially all directions, and illustrated from a centre of the bearing towards a border of the distribution 608, but only a finite and illustrative number of forces and thus directions and amplitudes are illustrated.

The somewhat thicker line 606 illustrates a resulting force vector when the distribution of forces to the right side of the drawing and thus towards one side of the bearing relative to the centre, are summarised during the sample period.

It is illustrated that the angle of the bearing surface 304, and thus also of a flush, parallel support surface (not illustrated) corresponding to the bearing surface 304, relatively to a shaft plane 310 formed by rotating the shaft (not shown) around the first axis (116, see FIG. 1 or 3), is perpendicular or substantially perpendicular to the resulting force vector 606. The angle 312 of the surface 304 relatively to the shaft plane is 30 degrees in the shown example.

Figure 7:
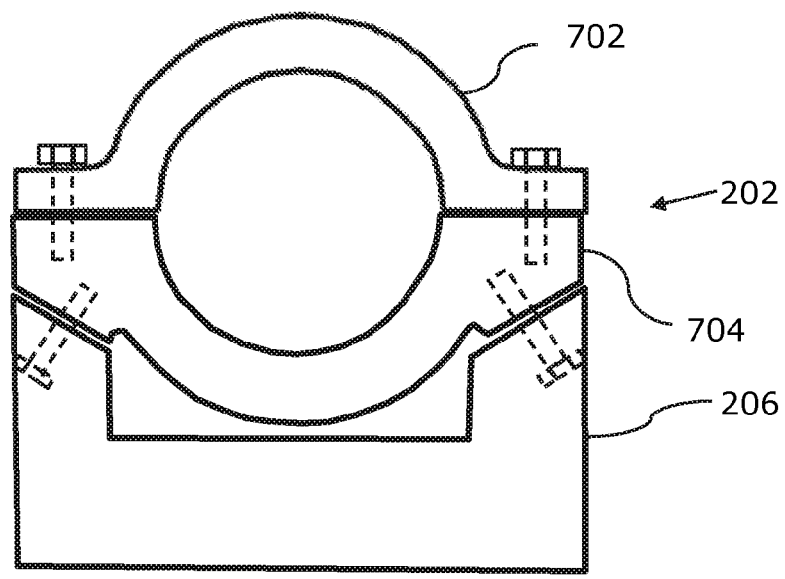
FIG. 7 is an illustration of a bearing with support, where the bearing is provided in two sections.

FIG. 7 shows a bearing 202 with corresponding bearing support 206 and it is illustrated that the bearing is provided with a plurality of sections, such as a first uppermost section 702 and a second lowermost section 704, where the lowermost section includes two bearing surfaces which are connected to two support surfaces. Such bearing with separate sections may be provided, among others in order to be able to replace one or more of the sections or the shaft for such bearings in a radial direction.

In that a size of a resulting and substantially radial force vector acting parallel to the shaft plane on the engagement between these two sections is far smaller than the radial forces acting on the connection between the complete bearing and the bearing support parallel to the shaft plane, such as about 10-50% thereof, the engagement and connection between the two sections may be non-angled relatively to the shaft plane as shown, but may such as in situations of extreme loads, such as due to extreme wind load conditions, be elected in line with the support angle 312 as disclosed herein.

Figure 8:
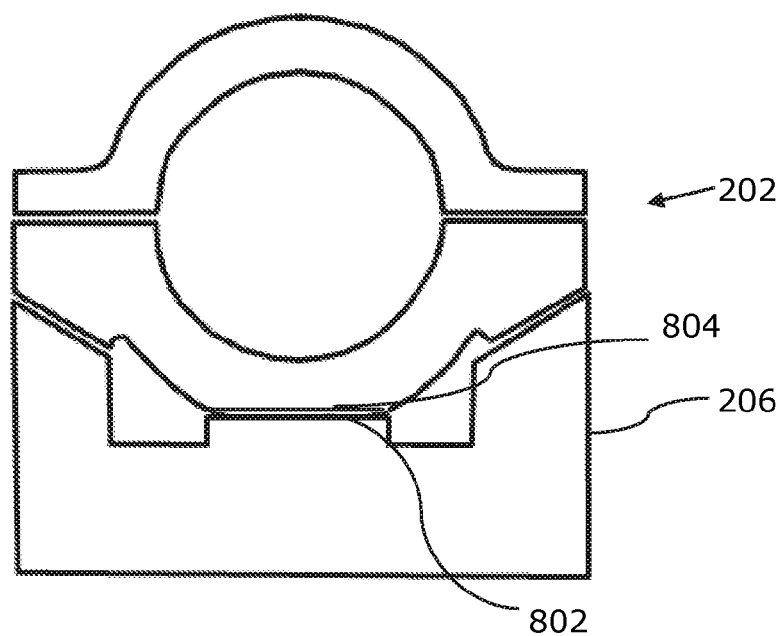
FIG. 8 is an illustration of a bearing system comprising an additional bearing and support surface.

FIG. 8 illustrates that the connection between the bearing 202 and the support 206 may comprise a non-angled bearing surface 804 and a corresponding non-angled support surface 802, relatively to the shaft plane. In such case the support angle of the angled bearing and support surfaces may or may not be provided with a somewhat decreased angle compared to when the non-angled support 802 and corresponding bearing surface were not present.

Figure 9:
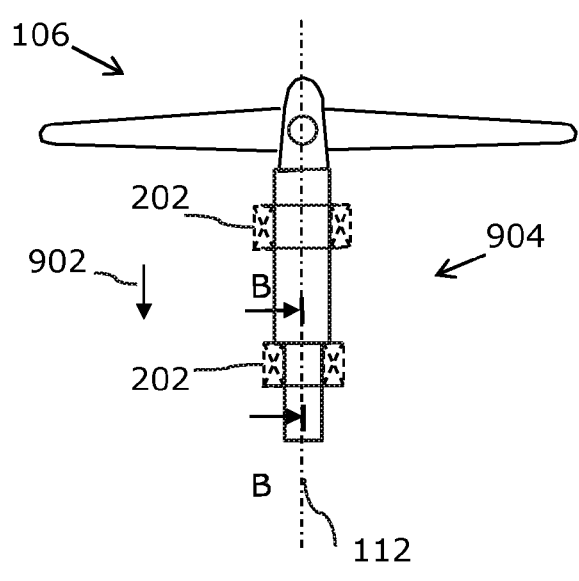
FIG. 9 is an illustration of a top view of a bearing system and FIG. 10 shows a cross sectional view B-B indicated in FIG. 9 and where the support angle is illustrated in a top view and relatively to an axial direction.

FIG. 9 is an illustration of a top view of a bearing system 904 with two bearings 202. The bearings are positioned around the shaft at two positions along the axial extension of the shaft, one adjacent to the rotor 106 and one less adjacent to the rotor. The bearing less adjacent to the rotor is to some extend dedicated forces in an axial direction of the main shaft.

Figure 10:
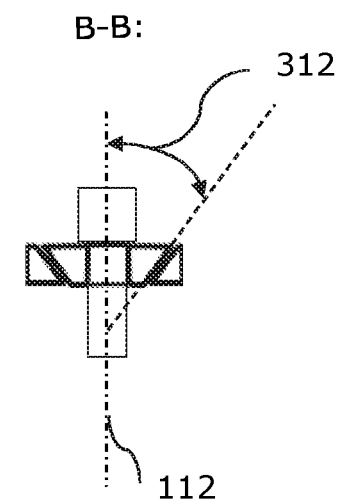

FIG. 10 shows a cross sectional view B-B through the bearing less adjacent to the rotor as indicated in FIG. 9. The figure illustrates that the support angle 312 of one support surface of this bearing is measured in a plane comprising the axial direction 902 of the shaft.

In short, it is disclosed herein that in order to provide a wind turbine generator with a shaft and a bearing system which bearing system, e.g., is provided using less material or using material which is relatively cheaper or which is not needed to have the same strength in comparison with some other solutions, there is disclosed a wind turbine generator with a bearing system including a lockable connection comprising a bearing surface and a support surface which surfaces are engaged when the lockable connection is locked and where forces from the shaft are transferred via the bearing and into the support through the bearing surface and wherein a support angle of the support surface, relatively to a shaft plane formed by rotating the shaft around a first axis, which first axis is perpendicular to the centre axis and which first axis is comprised in a vertical plane, is ranging from and including 5 degrees to and including 70 degrees.

Although the present invention has been described in connection with preferred embodiments, it is not intended to be limited to the specific form set forth herein. Rather, the scope of the present invention is limited only by the accompanying claims.

In this section, certain specific details of the disclosed embodiment are set forth for purposes of explanation rather than limitation, so as to provide a clear and thorough understanding of the present invention. However, it should be understood readily by those skilled in this art, that the present invention may be practised in other embodiments which do not conform exactly to the details set forth herein, without departing significantly from the spirit and scope of this disclosure. Further, in this context, and for the purposes of brevity and clarity, detailed descriptions of well-known apparatus, circuits and methodology have been omitted so as to avoid unnecessary detail and possible confusion.

In the claims, the term "comprising" does not exclude the presence of other elements or steps. Additionally, although individual features may be included in different claims, these may possibly be advantageously combined, and the inclusion in different claims does not imply that a combination of features is not feasible and/or advantageous. In addition, singular references do not exclude a plurality. Thus, references to "a", "an", "first", "second" etc. do not preclude a plurality.

The invention claimed is:

1. A wind turbine comprising a bearing system, the bearing system comprising:
    a bearing for bearing a shaft having a centre axis, the bearing comprising at least one bearing surface;
    a support for supporting the bearing, the support comprising at least one support surface; and
    a lockable connection between said bearing and said support, where the lockable connection comprises the at least one bearing surface and comprises the at least one support surface, wherein the support surface is directly and rigidly engaged with and supports the bearing surface when the lockable connection is locked and where forces from the shaft are transferred via the bearing and into the support through said bearing surface being engaged with said support surface, and where said lockable connection ensures a fixed distance between the bearing and the support by the surfaces being directly and rigidly engaged, and wherein a support angle of said support surface, relative to a shaft plane formed by rotating the shaft around a first axis, which first axis is perpendicular to the centre axis and which first axis is comprised in a vertical plane, is in a range from and including 5 degrees to and including 70 degrees.

2. The wind turbine according to claim 1, wherein said bearing surface and said support surface are adapted so that the support surface and the bearing surface are flush and parallel with each other.

3. The wind turbine according to claim 1, wherein the support angle is set to an angle in a range from and including 5 to and including 60 degrees.

4. The wind turbine according to claim 1, wherein the support angle is set to an angle in a range from and including 10 to and including 45 degrees.

5. The wind turbine according to claim 1, wherein the support angle is set to an angle in a range from and including 15 to and including 30 degrees.

6. The wind turbine according to claim 1, wherein a plurality of support surfaces is provided and where each of the plurality of support surfaces is arranged in order for each surface to form a part of a side of a virtual prism with a number of sides.

7. The wind turbine according to claim 1, wherein the bearing is provided in a plurality of sections and where at least one of the plurality of sections comprises a bearing surface connected to the support surface.

8. The wind turbine according to claim 1, wherein at least two support surfaces are provided and where the support angle of at least one of the at least two support surfaces is measured in a plane comprising a radial direction of the shaft.

9. The wind turbine according to claim 1, wherein at least two support surfaces are provided and where the support angle of at least one of the at least two support surfaces is measured in a plane comprising an axial direction of the shaft.

10. The wind turbine according to claim 1, where in the bearing system comprises a bearing with a set of two oppositely positioned bearing surfaces with a distance between the two bearing surfaces and two corresponding support surfaces, where the two corresponding bearing and support surfaces are provided with the same or substantially the same angle relative to the shaft plane.

11. The wind turbine according to claim 1, wherein two bearings are provided for bearing the shaft, one adjacent to a rotor of the wind turbine and one less adjacent to the rotor and where the shaft is a main shaft of the wind turbine.

12. The wind turbine according to claim 11, wherein the support for supporting the bearing most adjacent to the rotor comprises two symmetrically angled support surfaces relative to the first axis.

13. The wind turbine according to claim 12, wherein the support surfaces are provided and adapted so as to be engaged with two corresponding bearing surfaces on a lowermost half part, relative to the direction of gravity, of the bearing.

14. The wind turbine according to claim 11, wherein the support for supporting the bearing less adjacent to the rotor comprises at least one support surface with a support angle which is measured in a plane comprising an axial direction of the shaft.

* * * * *